United States Patent
Suzuki

(10) Patent No.: US 9,283,953 B2
(45) Date of Patent: Mar. 15, 2016

(54) TRAVEL CONTROL DEVICE

(71) Applicant: Naoto Suzuki, Fujinomiya (JP)

(72) Inventor: Naoto Suzuki, Fujinomiya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/374,329

(22) PCT Filed: Dec. 11, 2012

(86) PCT No.: PCT/JP2012/082107
§ 371 (c)(1),
(2) Date: Jul. 24, 2014

(87) PCT Pub. No.: WO2013/111464
PCT Pub. Date: Aug. 1, 2013

(65) Prior Publication Data
US 2015/0019060 A1  Jan. 15, 2015

(30) Foreign Application Priority Data
Jan. 26, 2012  (JP) .................................. 2012-014515

(51) Int. Cl.
*B60L 11/00* (2006.01)
*G05D 1/00* (2006.01)
(Continued)

(52) U.S. Cl.
CPC .......... *B60W 20/106* (2013.01); *B60L 11/1862* (2013.01); *B60W 10/06* (2013.01);
(Continued)

(58) Field of Classification Search
CPC ..... B60W 10/00; B60W 10/06; B60W 10/08; B60W 10/14; B60W 10/26; B60W 2510/244; B60W 2550/142; B60L 11/1862; Y02T 10/705; Y02T 10/7044; Y02T 10/7005; Y02T 10/6269
USPC ......... 701/22, 533; 180/65.25, 65.625, 65.28, 180/65.29
See application file for complete search history.

(56) References Cited

U.S. PATENT DOCUMENTS 8,204,638 B2  6/2012 Tani et al.
8,210,293 B2  7/2012 Ang et al.
(Continued)

FOREIGN PATENT DOCUMENTS

CN  101253089 A  8/2008
DE  10 2009 028 922 A1  3/2011
(Continued)

OTHER PUBLICATIONS

International Search Report Issued Jan. 15, 2013 in PCT/JP12/082107 Filed Dec. 11, 2012.

*Primary Examiner* — Jason Holloway
*Assistant Examiner* — Rachid Bendidi
(74) *Attorney, Agent, or Firm* — Oblon, McClelland, Maier & Neustadt, L.L.P.

(57) ABSTRACT

A travel control device selects the travel modes of the hybrid vehicle that includes a battery configured to be charged with electric power from an external power source, an MG configured to generate a driving force for running with the electric power of the battery, and an engine configured to generate a driving force for running. The travel control device includes a second estimating unit and a drive switching unit. The second estimating unit estimates an expected charging time at a destination where the battery can be charged. The drive switching unit increases a usage frequency of the EV mode until reaching to the destination in a case where the expected charging time estimated by the second estimating unit is longer than a case where expected charging time is short.

5 Claims, 9 Drawing Sheets

(51) Int. Cl.
- *G05D 3/00* (2006.01)
- *G06F 7/00* (2006.01)
- *G06F 17/00* (2006.01)
- *B60W 20/00* (2006.01)
- *B60W 10/26* (2006.01)
- *B60L 11/18* (2006.01)
- *B60W 10/06* (2006.01)
- *B60W 10/08* (2006.01)

(52) U.S. Cl.
CPC .............. *B60W 10/08* (2013.01); *B60W 10/26* (2013.01); *B60W 2510/244* (2013.01); *B60W 2550/142* (2013.01); *Y02T 10/6269* (2013.01); *Y02T 10/705* (2013.01); *Y02T 10/7005* (2013.01); *Y02T 10/7044* (2013.01)

(56) References Cited

U.S. PATENT DOCUMENTS

| | | |
|---|---|---|
| 2003/0015358 A1 | 1/2003 | Abe et al. |
| 2008/0262668 A1* | 10/2008 | Yamada ........................... 701/22 |
| 2009/0299558 A1* | 12/2009 | Hidaka .............................. 701/22 |
| 2009/0319110 A1* | 12/2009 | Tani et al. ........................ 701/22 |
| 2010/0006359 A1 | 1/2010 | Ang et al. |
| 2010/0280687 A1* | 11/2010 | Tate et al. ........................ 701/22 |

FOREIGN PATENT DOCUMENTS

| | | |
|---|---|---|
| JP | 2008 94230 | 4/2008 |
| JP | 2008-100645 A | 5/2008 |
| JP | 2010 884 | 1/2010 |

\* cited by examiner

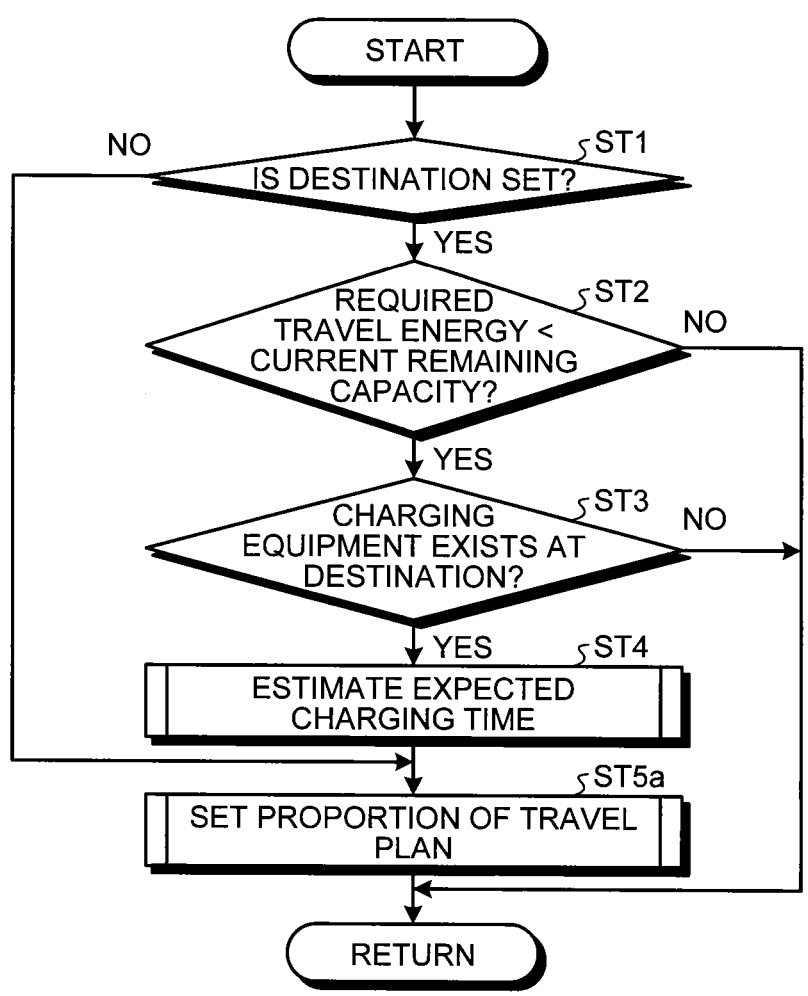

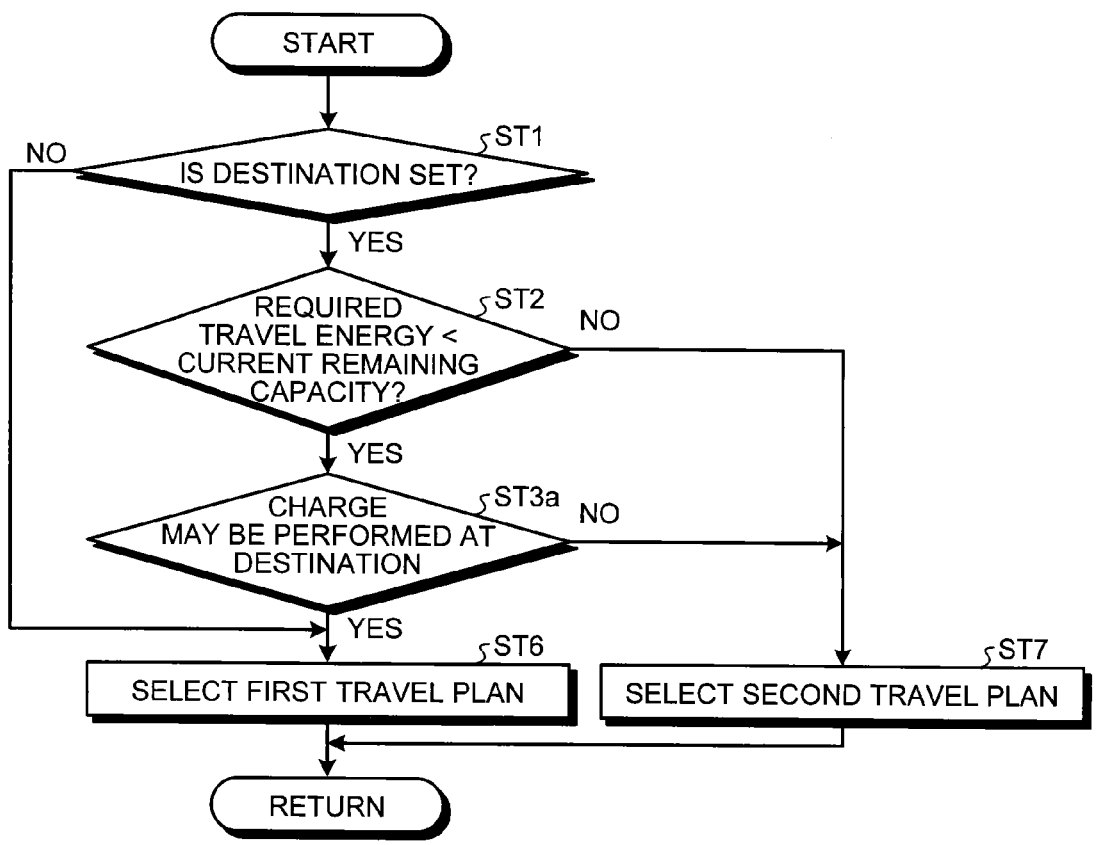

TRAVEL CONTROL DEVICE

FIELD

The present invention relates to a travel control device.

BACKGROUND

Conventionally, a travel control device that is installed in a vehicle and controls a travel of the vehicle is known. For example, Patent Literature 1 discloses a travel control device of a hybrid vehicle that selects, depending on driving conditions, whether travelling with a driving force for running only by a motor, or travelling with a driving force for running at least by an engine in the hybrid vehicle including the motor and the engine as driving sources of the vehicle.

The conventionally used travel control device of a hybrid vehicle described, for example, in the above-described Patent Literature 1 determines whether a state of charge (hereinafter referred to as SOC) of a battery (also referred to as secondary battery) providing electric power to a motor is a state below a first predetermined value, which is determined in advance, or a state of high load, for example, during high speed running or uphill running, which requires relatively high torque. The travel control device selects to travel with a driving force for running at least by an engine if it is determined to be one of the cases: the SOC is in a state below the first predetermined value, which is determined in advance; and a state of high load, for example, during high speed running or uphill running, which requires relatively high torque. Also, the travel control device selects to travel with a driving force for running only by a motor if it is determined not to be any of the cases: the SOC is in a state below the first predetermined value, which is determined in advance; and a state of high load, for example, in high speed running or uphill running, which requires relatively high torque.

CITATION LIST

Patent Literature

Patent Literature 1: Japanese Patent Application Laid-open No. 2010-000884

SUMMARY

Technical Problem

However, the travel control device described in, for example, the above-described Patent Literature 1 is desired to further reduce the total running cost of a hybrid vehicle.

The present invention has been made in view of the above-described problem, and one of its objectives is to provide a travel control device that can further reduce the total running cost of a hybrid vehicle.

Solution to Problem

In order to achieve the above mentioned object, a travel control device according to the present invention of a hybrid vehicle includes a battery configured to be charged with electric power from an external power source; a motor configured to generate a driving force for running with the electric power of the battery; and an engine configured to generate a driving force for running, the travel control device being configured to select an EV mode for travelling with a driving force for running only by a motor, and an HV mode for travelling with a driving force for running at least by an engine, wherein the travel control device estimates an expected charging time at a set destination where the battery can be charged, and selects the EV mode and the HV mode in such a way as to increase a usage frequency of the EV mode until reaching the destination in a case where the estimated expected charging time is longer than a threshold value than a case where the expected charging time is shorter than a threshold value.

In addition, in the travel control device, it is preferable that the travel control device stores an actual charging time taken for actually charging the battery from the external power source for each vehicle stop location of the hybrid vehicle, and estimates the expected charging time based on the stored actual charging time for each vehicle stop location.

Further, in the travel control device, it is preferable that the travel control device selects the EV mode and the HV mode in a such a way as to suppress a usage frequency of the HV mode during a state of high load until reaching the destination in a case where the estimated expected charging time is longer than the threshold value than a case where the expected charging time is shorter than the threshold value.

Advantageous Effects of Invention

The travel control device according to the present invention increases the usage frequency of the EV mode for travelling with a driving force for running only by a motor when an expected charging time at an estimated destination where a battery can be charged is long. Accordingly, the travel control device can successfully reduce the deterioration of fuel economy and further reduce the total running cost of the hybrid vehicle.

BRIEF DESCRIPTION OF DRAWINGS

FIG. 7 is a flowchart for selecting the travel plans of the ECU in the travel control device of a modification according to the embodiment.

FIG. 8 is an explanatory diagram illustrating a map for setting a proportion of the first travel plan of a drive switching unit of the ECU in the travel control device of the modification according to the embodiment.

FIG. 9 is a flowchart for selecting the travel plans of an ECU in a travel control device according to a disclosed example 1.

DESCRIPTION OF EMBODIMENTS

The following describes the embodiment according to the present invention with reference to the drawings. Note that the present invention is not limited to the embodiment. Also, the components of the embodiment described below encompass components that can be easily replaced by a person skilled in the art or components that are substantially same.

Embodiment

Figure 1:
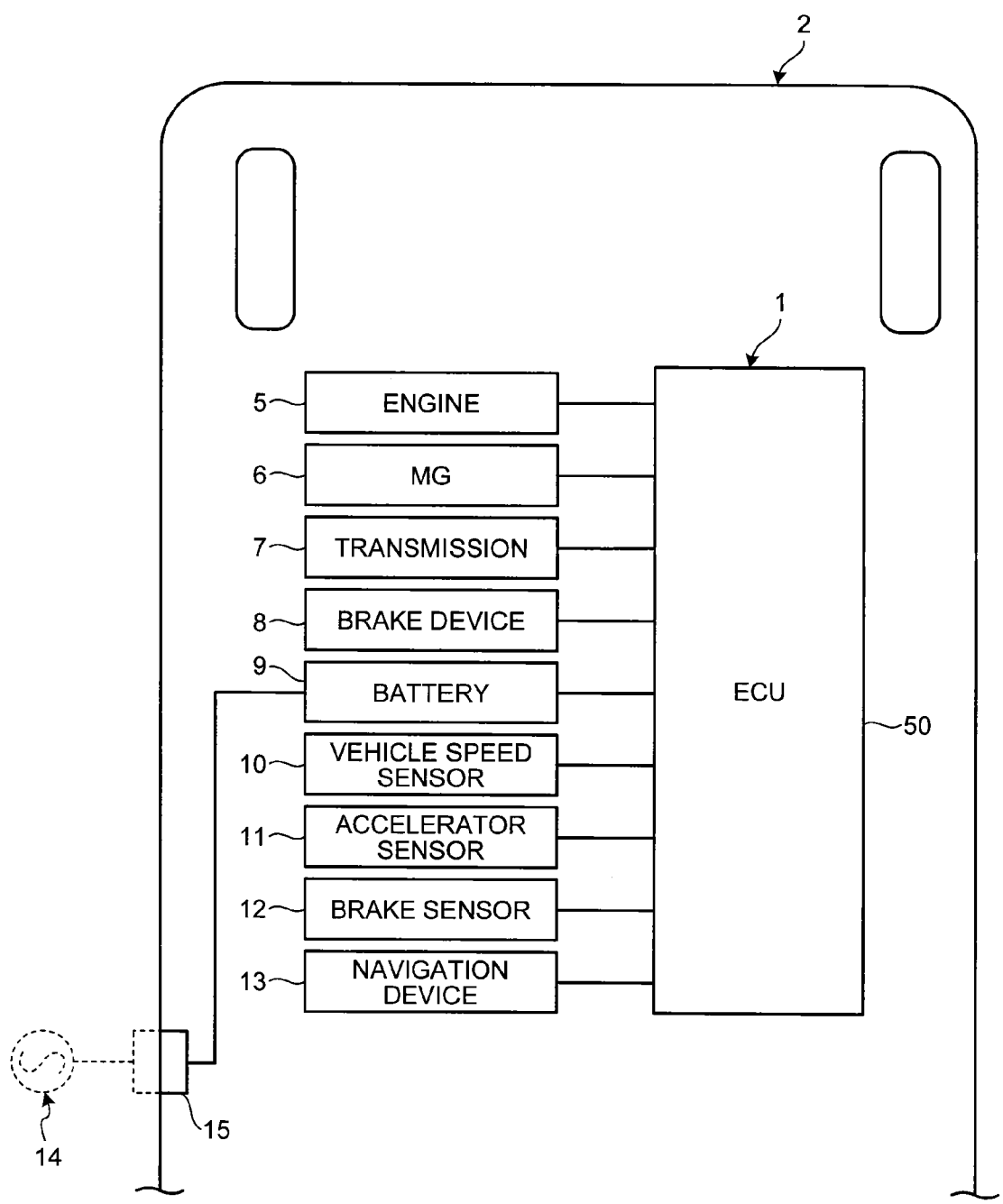
FIG. 1 is a schematic configuration diagram of a hybrid vehicle including a travel control device according to an embodiment.
Figure 2:
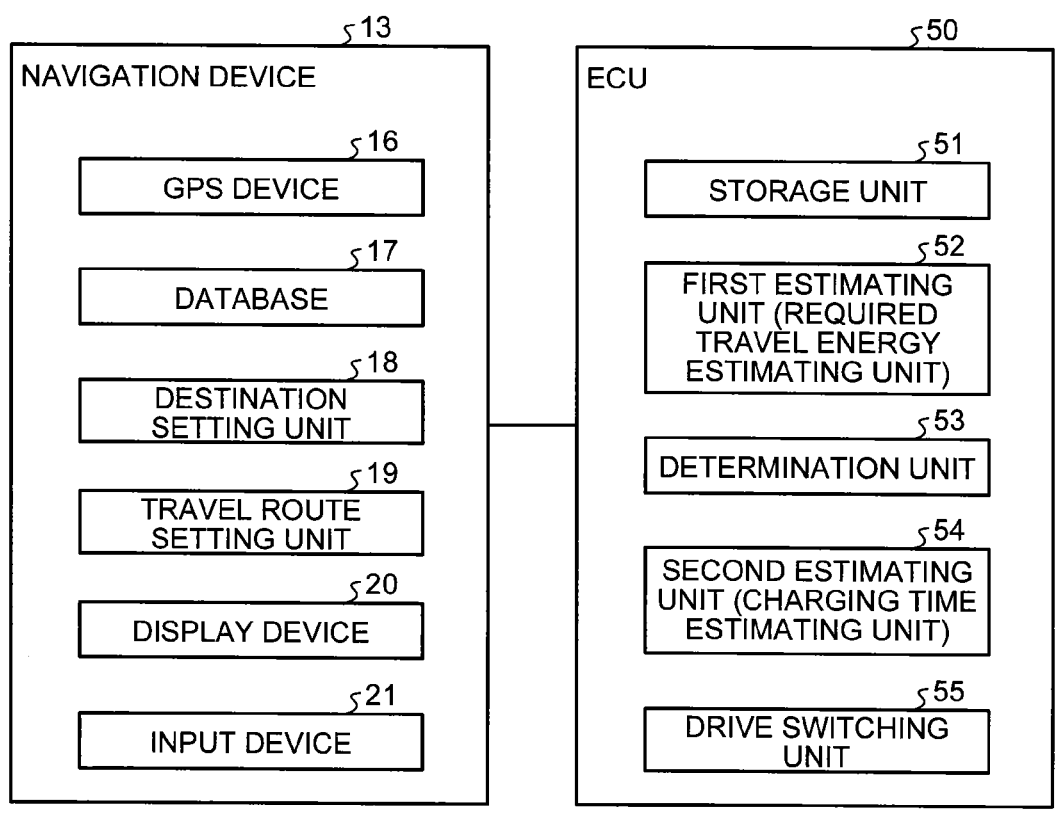
FIG. 2 is a schematic configuration diagram of an ECU and a navigation device in the travel control device according to the embodiment.

FIG. 1 is a schematic configuration diagram of a hybrid vehicle including a travel control device according to an embodiment. FIG. 2 is a schematic configuration diagram of an ECU and a navigation device in the travel control device according to the embodiment. As illustrated in FIG. 1, a travel control device 1 according to the embodiment is installed in a hybrid vehicle 2 having driving sources for running, which rotationally drive the driving wheels in combination of an engine 5 and an MG 6 as a motor. The travel control device 1 includes an Electronic Control Unit 50 (ECU). Then, the travel control device 1 selects the travel plans of the hybrid vehicle 2 by causing the ECU 50 to control the engine 5, the MG 6, and a transmission 7, which is described below, corresponding to the conditions.

The travel control device 1 of the embodiment selects the travel plans based on an expected charging time at a destination where a battery 9 can be charged. This allows the travel control device 1 to further reduce the total running cost of the hybrid vehicle 2. The travel control device 1 of the embodiment selects a first travel plan that inhibits an HV mode in a state of high load of the HV mode among an EV mode and the HV mode, which are described below, and a second travel plan that allows the HV mode in a state of high load.

Specifically, the hybrid vehicle 2 includes the engine 5 as an internal combustion engine, the motor generator (hereinafter referred to as "MG") 6, the transmission 7, a brake device 8, and the battery 9, and the like. Also, the hybrid vehicle 2 includes a vehicle speed sensor 10, an accelerator sensor 11, a brake sensor 12, a navigation device 13, and the like.

The engine 5 applies a driving force for running to the wheels of the hybrid vehicle 2 in response to an acceleration request by a driver, for example, a pressing operation of an accelerator pedal. The engine 5 consumes a fuel to generate an engine torque as a torque of an internal combustion engine for a driving force for running to apply the driving wheels of the hybrid vehicle 2. In a word, the engine 5 is a heat engine that burns a fuel to generate heat energy and output the heat energy in the form of mechanical energy such as a torque, and the examples of the heat engine include a gasoline engine, a diesel engine, and an LPG engine. The engine 5 includes, for example, a fuel injection device, an ignition device, and a throttle valve device, which are not illustrated, and these devices are electrically coupled to the ECU 50 and are controlled by the ECU 50. The ECU 50 controls an output torque of the engine 5. Note that a driving force for running generated by the engine 5 may be used for electric generation in the MG 6.

The MG 6 applies a driving force for running to the wheels of the hybrid vehicle 2 in response to an acceleration request by a driver, for example, the pressing operation of the accelerator pedal. The MG 6 converts electric energy into mechanical power to generate a motor torque as a driving force for running applied to the driving wheels of the hybrid vehicle 2. The MG 6 is a rotating electrical machine including a stator as a stationary member and a rotor as a rotation member. The MG 6 is an electric motor that converts electric energy into mechanical power, as well as an electric generator that converts mechanical power into electric energy to recover the electric energy. Namely, the MG 6 has a function as an electric motor that operates by providing electric power, and converts the electric energy into mechanical energy to output (power running function), and a function as an electric generator that converts mechanical energy into electric energy (regenerative function). The MG 6 is electrically coupled to the ECU 50 via an inverter or similar component that performs conversion between a direct current and an alternating current, and is controlled by the ECU 50. The ECU 50 controls an output torque and an electric generation amount of the MG 6 via the inverter.

The transmission 7 is a power transmission that shifts gears and transmits a rotary driving force from the engine 5 or the MG 6 to the side of the driving wheels of the hybrid vehicle 2. The transmission 7 may be a manual transmission (MT), or also may be an automatic transmission such as a stepped automatic transmission (AT), a continuously variable transmission (CVT), a multi-mode manual transmission (MMT), a sequential manual transmission (SMT), a dual clutch transmission (DCT). The transmission 7 will be described herein, for example, as a continuously variable transmission (CVT) having a planetary gear mechanism or similar mechanism. The transmission 7 includes the transmission actuator and similar component electrically coupled to the ECU 50, and is controlled by the ECU 50.

The brake device 8 applies a braking force to the wheels of the hybrid vehicle 2 in response to a brake request operation by a driver, for example, the pressing operation of a brake pedal. The brake device 8 generates a predetermined friction force (friction resistance force) between friction elements such as brake pads and brake discs to provide a braking force to the wheels rotatably supported to a vehicle body of the hybrid vehicle 2. This allows the brake device 8 to generate a braking force at contact surfaces between the wheels of the hybrid vehicle 2 and the road surface to brake the hybrid vehicle 2. The brake device 8 includes a brake actuator or similar component electrically coupled to the ECU 50, and is controlled by the ECU 50.

The battery 9 is an electric storage device that can store electric power (electric storage) and discharge the stored electric power. The battery 9 is electrically coupled to the ECU 50, and outputs signals related to various kinds of information to the ECU 50. The battery 9 according to the embodiment detects a state of charge (hereinafter, referred to as SOC), and outputs the detected result to the ECU 50. Note that, in the present invention, the SOC refers to a value, which is obtained by dividing the remaining capacity of the battery 9 by the full charge capacity of the battery 9, shown as a percentage indicated by multiplying by 100. That is, the SOC=((the remaining capacity of the battery 9)/(the full charge capacity of the battery 9))×100.

Also, the battery 9 is coupled to the MG 6 via an inverter (not illustrated). Further, the battery 9 is connected to a connector 15 via an inverter, and the connector 15 is to be connected to an external power source 14 such as a domestic power source. The battery 9 is supplied with electric power from the external power source 14 such as the domestic power source via the connector 15 and the inverter. This allows charging of the battery 9 with the electric power from the external power source 14 by connecting the connector 15 to the external power source 14. Note that, in the present invention, the external power source 14 refers to a power source that can charge the battery 9 via the connector 15 or similar member.

When the MG 6 works as an electric motor, the electric power stored in the battery 9 is supplied to the MG 6 via the inverter, and the supplied electric power is converted into a driving force for running of the hybrid vehicle 2 to be output. Also, when the MG 6 works as an electric generator, the electric power is generated by an input driving force, and the generated electric power is stored in the battery 9 via the inverter. At this time, the MG 6 can brake the rotation of the rotor with rotation resistance generated on the rotor (regeneration brake). As a result, during regeneration braking, the MG 6 can generate a motor regeneration torque, which is a negative motor torque of the rotor by regenerating the electric power, resulting in providing a braking force to the driving wheels of the hybrid vehicle 2. That is, a mechanical power is input to the MG 6 from the driving wheels, causing the MG 6 to generate electric energy by regeneration, accordingly the hybrid vehicle 2 can recover movement energy of the hybrid vehicle 2 as electric energy. Then, mechanical power (negative motor torque) generated on the rotor of the MG 6 is transmitted to the driving wheels, accordingly the hybrid vehicle 2 can perform regeneration braking with the MG 6. In this case, in the hybrid vehicle 2, when a regeneration amount (electric generation amount) by the MG 6 is relatively small, the generated braking force is relatively small, then a deceleration degree applied to the hybrid vehicle 2 becomes relatively small. On the other hand, in this hybrid vehicle 2, when a regeneration amount (electric generation amount) by the MG 6 is relatively large, the generated braking force is relatively large, then a decelerate degree applied to the hybrid vehicle 2 becomes relatively large.

The vehicle speed sensor 10, the accelerator sensor 11, and the brake sensor 12 are state detecting devices that detect a running state of the hybrid vehicle 2 or an input to the hybrid vehicle 2 by a driver (driver input), that is, a state quantity and a physical quantity related to actual operation of the hybrid vehicle 2 by a driver. The vehicle speed sensor 10 detects a vehicle speed of the hybrid vehicle 2 (hereinafter, sometimes referred to as "vehicle speed"). The accelerator sensor 11 detects an accelerator opening degree, which is an operation amount (depressed amount) of the accelerator pedal by a driver. The brake sensor 12 detects an operation amount (depressed amount) of the brake pedal, for example, a master cylinder pressure or similar pressure. The vehicle speed sensor 10, the accelerator sensor 11, and the brake sensor 12 are electrically coupled to the ECU 50, and output the detected signals to the ECU 50.

The navigation device 13 is a device that detects a current position and obtains the position of the hybrid vehicle 2 in map information, which is stored in advance, and calculates a travel route to a destination as well as displays the position of the hybrid vehicle 2 and the travel route to the destination or similar information. The navigation device 13 is on-vehicle equipment installed in the hybrid vehicle 2, and includes a global positioning system (hereinafter referred to as "GPS") device 16, a database 17, a destination setting unit 18, a travel route setting unit 19, a display device 20, and an input device 21 as illustrated in FIG. 2.

The GPS device 16 is a device that detects the current position of the hybrid vehicle 2. The GPS device 16 receives GPS signals output from a GPS satellite, and performs positioning and operation of GPS information (X-coordinate: X, Y-coordinate: Y), which is the location information of the hybrid vehicle 2 based on the received GPS signal. The GPS device 16 is electrically coupled to the ECU 50, and outputs signals related to the GPS information to the ECU 50.

The database 17 stores various kinds of information. The database 17 includes map information including road information, and various kinds of information or learning information or similar information obtained in actual travel of the hybrid vehicle 2. Examples of the road information include road gradient information, road surface condition information, road shape information, speed limit information, road curvature (curve) information, stop sign information, stop line position information or similar information. The ECU 50 appropriately refers to the information stored in the database 17, and reads out required information. Note that although the database 17 is illustrated as being installed in the hybrid vehicle 2, the database 17 is not limited to this and can be placed in a location outside of the hybrid vehicle 2, such as an information center, the ECU 50 may appropriately refers to the information stored in the database 17, and read out required information via, for example, wireless communications (not illustrated). Also, the database 17 of the embodiment stores, as map information, information indicative of whether or not the external power source 14 that can charge the battery 9 exists at a destination set by the destination setting unit 18.

The destination setting unit 18 is a unit to which information indicative of the location of a destination for the hybrid vehicle 2 is input via the input device 21 by a vehicle occupant or similar member. The ECU 50 appropriately refers to the information indicative of the location of the destination stored in the destination setting unit 18 to read out the information. Note that, for example, when a predetermined time elapsed since the input of the information indicative of the location of the destination from the input device 21, the information indicative of the location of the destination input into the destination setting unit 18 is deleted if the destination is reached, the destination being input from the input device 21 based on the information from the GPS device 16.

the travel route setting unit 19 calculates a travel route to the destination based on the GPS information (X-coordinate: X, Y-coordinate: Y), which is current location information of the hybrid vehicle 2 obtained by the GPS device 16 by performing positioning and operation, and the map information stored in the database 17 or similar information, and stores the travel route. The ECU 50 appropriately refers to the information indicative of the travel route to the destination stored in the travel route setting unit 19 to read out the information.

The display device 20 includes a display device (visual information display device) and a speaker (sound output device), and a similar device, which are placed in an occupant compartment of the hybrid vehicle 2. The display device 20 displays a position of the hybrid vehicle 2, a destination, and a travel route with map information, and similar information. The input device 21 includes operating buttons or similar member, which are placed in the occupant compartment of the hybrid vehicle 2. The input device 21 is used for inputting the destination or similar information.

The ECU 50 is a control unit that integrally controls the whole hybrid vehicle 2 and is configured as, for example, an electronic circuit mainly includes well-known microcomputers including a CPU, a ROM, a RAM and an interface. The ECU 50 receives the detection results detected by the vehicle speed sensor 10, the accelerator sensor 11, and the brake sensor 12, the GPS information obtained by the GPS device 16, various kinds of information stored in the database 17, drive signals of each portion, electrical signals corresponding to a control command or similar command. The ECU 50 controls the engine 5, the MG 6, the transmission 7, the brake device 8, and the battery 9, and the like in response to these input electrical signals, and similar signals. For example, the ECU 50 performs drive control of the engine 5, drive control of the MG 6, transmission control of the transmission 7, and brake control of the brake device 8 or similar control based on an accelerator opening degree, and a vehicle speed or similar information. Also, for example, the ECU 50 uses the engine 5 and the MG 6 in combination or selects one of the engine 5 and the MG 6 to use in response to the driving conditions to realize various travel modes such as the EV mode and the HV mode.

Note that, in the present invention, the EV mode refers to a travel mode that causes the hybrid vehicle 2 to travel with a driving force for running only by the MG 6, while the HV mode refers to a travel mode that causes the hybrid vehicle 2 to travel with a driving force for running at least by the engine 5. Also, in the HV mode, the ECU 50 operates the engine 5 in an efficient state as much as possible, while causing the MG 6, which is a rotating electrical machine, to compensate a surplus or shortage of a driving force for running or an engine brake force, as well as to perform regeneration of energy during decelerating to improve fuel economy.

Also, for example, the ECU 50 can detect an ON/OFF state of accelerator operation, which is an acceleration request to the hybrid vehicle 2 by a driver, and an accelerator opening degree based on the detected result by the accelerator sensor 11. Similar to this, for example, the ECU 50 can detect an ON/OFF state of brake operation, which is a brake request to the hybrid vehicle 2, based on the detected result by the brake sensor 12. Note that a state where an accelerator operation by a driver is OFF refers to a state where the driver stops acceleration request operation to the hybrid vehicle 2, while a state where an accelerator operation by a driver is ON refers to a state where the driver continues acceleration request operation to the hybrid vehicle 2. Similar to this, a state where a brake operation by a driver is OFF refers to a state where the driver stops brake request operation to the hybrid vehicle 2, while a state where a brake operation by a driver is ON refers to a state where the driver continues brake request operation to the hybrid vehicle 2. Also, the ECU 50 detects a driver request power based on an accelerator opening degree.

Note that, in this embodiment, the travel control device 1 includes the above-described ECU 50. Also, in the present invention, the travel control device 1 may include the navigation device 13, various kinds of sensors that detect a state of the vehicle, and various kinds of information acquisition units that provide surrounding information in addition to the ECU 50. The travel control device 1 can further reduce the total running cost of the hybrid vehicle 2 by causing the ECU 50 to select the first travel plan or the second travel plan depending on the conditions, and select the EV mode and the HV mode in each travel plan.

Schematically explaining, when a destination is set in the destination setting unit 18, the ECU 50 determines whether or not the electric power required for travelling to the destination only by the EV mode (corresponding to required travel energy) is below a current remaining capacity of the battery 9 based on the travel route calculated by the travel route setting unit 19. When the required electric power is determined to be below the current remaining capacity of the battery 9, the travel control device 1 refers to information stored in the database 17. Then, the travel control device 1 estimates expected charging time at the destination based on the information stored in a storage unit 51, which is described below, when the external power source 14 exists at the destination, and selects the first travel plan when the estimated expected charging time is longer than a threshold value. The travel control device 1 selects the second travel plan in the case of anyone of when the required travel energy is determined not to be below the currently remaining capacity, or when no external power source 14 exists at the destination, or when the estimated expected charging time is shorter than the threshold value.

The following describes an exemplary configuration of the ECU 50 with reference to FIG. 2. As illustrated in FIG. 2, the ECU 50 includes the storage unit 51, a first estimating unit 52 (corresponding to a required travel energy estimating unit), a determination unit 53, a second estimating unit 54 (corresponding to a charging time estimating unit), and a drive switching unit 55.

The storage unit 51 refers to information of the navigation device 13, and classifies and stores times actually taken to charge the battery 9 from the external power source 14 (hereinafter referred to as actual charging time) for each location where the hybrid vehicle 2 stops. The storage unit 51 appropriately accumulates and stores an actual charging time for each location where the hybrid vehicle 2 stops. Specifically, when the actual charging times in the past at a vehicle stop location A where an X-coordinate is x1 and a Y-coordinate is y1 are A1, A2, . . . An, and the actual charging times in the past at a vehicle stop location B, where an X-coordinate is x2 and a Y-coordinate is y2 are B1, B2, . . . Bn, the storage unit 51 associates the vehicle stop location A with the actual charging times A1, A2, . . . An, and store them, and also associates the vehicle stop location B with the actual charging times B1, B2, . . . Bn, and stores them.

The first estimating unit 52 estimates an electric power (corresponding to required travel energy) required for travelling to a destination, which is input from the input device 21, only by the EV mode based on a travel route calculated by the travel route setting unit 19.

The determination unit 53 refers to information in the destination setting unit 18 of the navigation device 13 to determine whether or not a destination is set in the destination setting unit 18. Also, the determination unit 53 determines whether or not the electric power corresponding to the required travel energy estimated by the first estimating unit 52 is below the current remaining capacity of the battery 9. Further, the determination unit 53 refers to the information in the destination setting unit 18 of the navigation device 13 and the database 17 to determine whether or not the external power source 14 exists at the destination.

The second estimating unit 54 estimates an expected charging time (a time in which the battery 9 can be charged from the external power source 14 and the hybrid vehicle 2 stops) at the destination, which is input from the input device 21, based on the actual charging time for each vehicle stop location of the hybrid vehicle 2 stored in the storage unit 51. Specifically, the second estimating unit 54 calculates, from the information accumulated in the storage unit 51, an average value of the actual charging times in the past at the destination input from the input device 21, and sets the calculated average value as an expected charging time. For example, when a destination input from the input device 21 is the location A, which is described above, the second estimating unit 54 calculates an average value of charging times A1, A2, . . . An in the past stored in the storage unit 51, and sets the calculated average value as an expected charging time. Also, in the present invention, the second estimating unit 54 may set a value other than the average value if the setting value can be obtained from the actual charging times A1, A2, . . . An in the past or similar time stored in the storage unit 51. Also, if the information accumulated in the storage unit 51 does not include information indicative of actual charging times in the past at the destination input from the input device 21, a default value input in advance will be set as an expected charging time. Note that this default value preferably exceeds a threshold value, which is described below.

The drive switching unit 55 selects the first travel plan if the expected charging time estimated by the second estimating unit 54 exceeds the threshold value, which is determined in advance. Also, the drive switching unit 55 selects the second travel plan if the estimated expected charging time is equal to or less than the threshold value, which is determined in advance.

Figure 3:
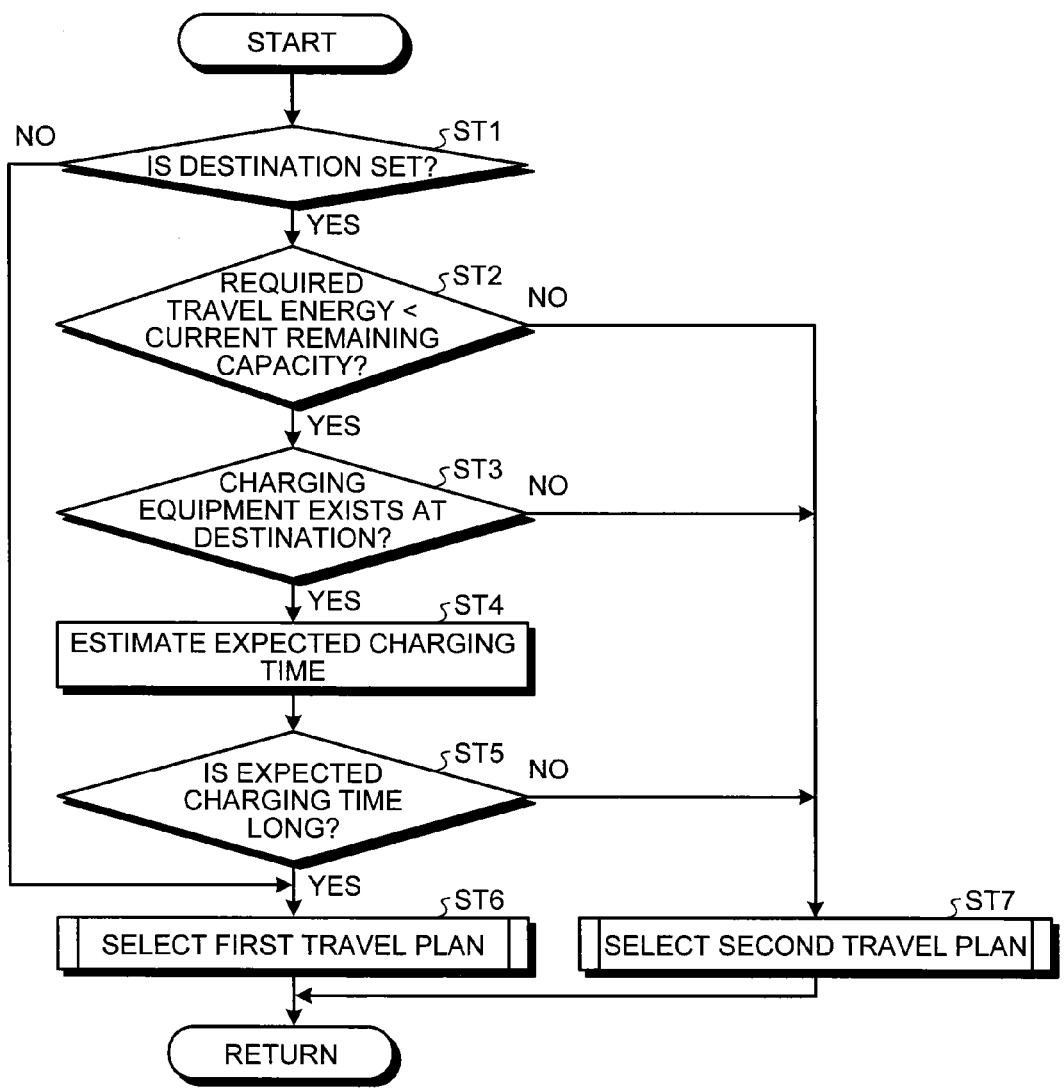
FIG. 3 is a flowchart for selecting travel plans of the ECU in the travel control device according to the embodiment.
Figure 4:
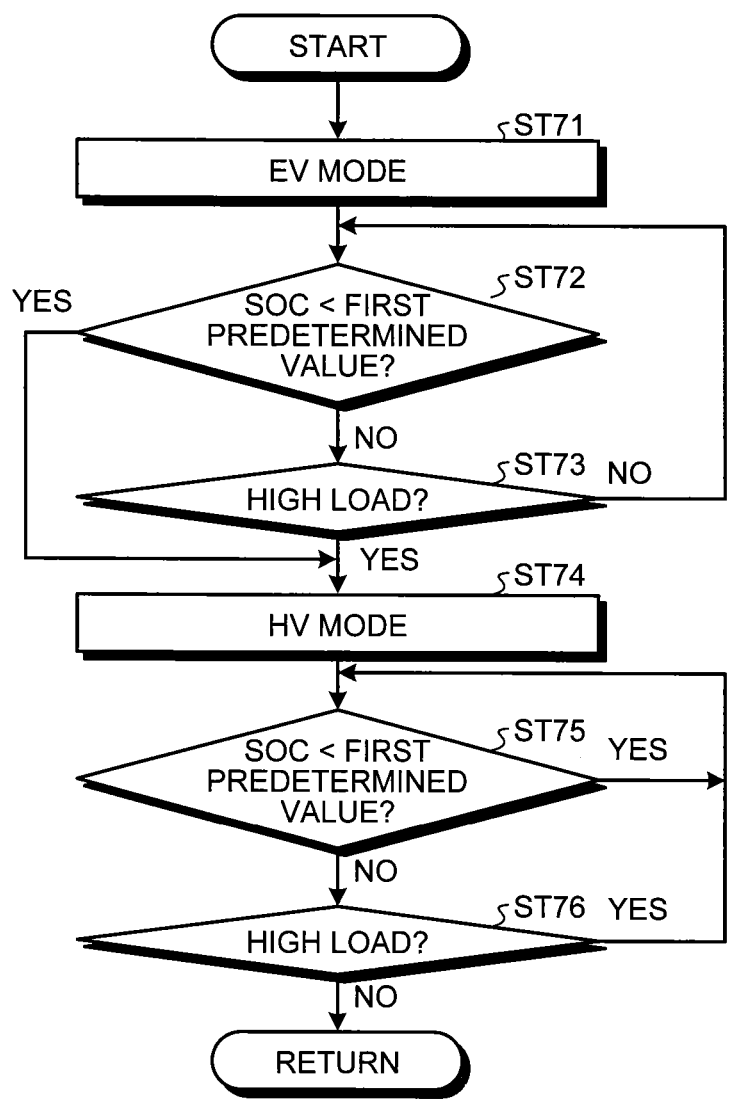
FIG. 4 is a flowchart illustrating a second travel plan of the ECU in the travel control device according to the embodiment.
Figure 5:
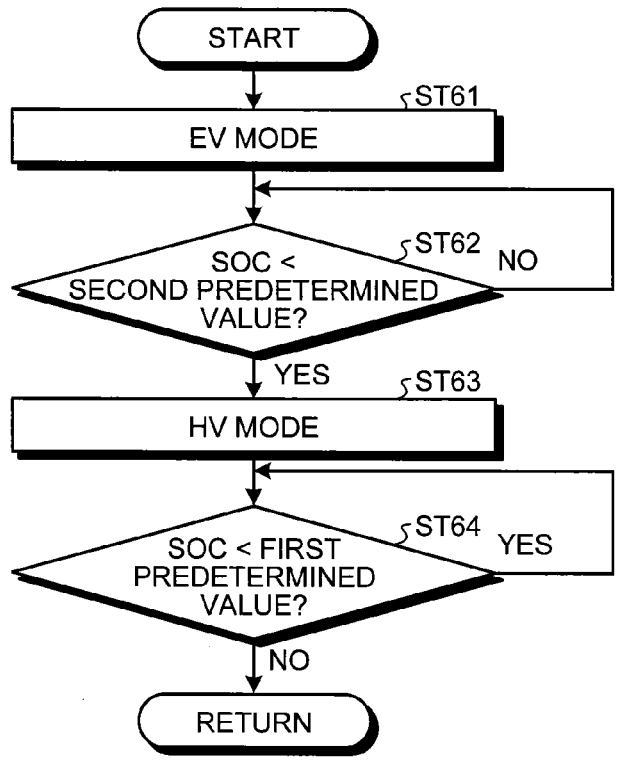
FIG. 5 is a flowchart illustrating a first travel plan of the ECU in the travel control device according to the embodiment.

The following describes an exemplary process of the ECU in the travel control device according to the embodiment with reference to FIG. 3 through FIG. 5. FIG. 3 is a flowchart for selecting the travel plans of the ECU in the travel control device according to the embodiment. FIG. 4 is a flowchart of the second travel plan of the ECU in the travel control device according to the embodiment. FIG. 5 is a flowchart of the first travel plan of the ECU in the travel control device according to the embodiment.

After the hybrid vehicle 2 is activated, the determination unit 53 of the ECU 50 in the travel control device 1 refers to information from the navigation device 13 to determine whether or not the information indicative of the location of a destination is input into the destination setting unit 18 in the step ST1 of FIG. 3. That is, the determination unit 53 of the ECU 50 in the travel control device 1 determines whether or not the destination is set, and the process proceeds to the step ST2 if the destination is determined to be set, or the process proceeds to the step ST6 if the destination is determined not to be set. Note that, in the present invention, the activation of the hybrid vehicle 2 refers to a state where the hybrid vehicle 2 can immediately travel by operation of an accelerator pedal after the power supply of the hybrid vehicle 2 is turned on.

In the step ST2, the first estimating unit 52 of the ECU 50 in the travel control device 1 estimates the electric power corresponding to the required travel energy based on the travel route or similar information calculated by the travel route setting unit 19. Then in the step ST2, the determination unit 53 of the ECU 50 in the travel control device 1 determines whether or not the electric power corresponding to the estimated required travel energy is below the current remaining capacity of the battery 9. If the determination unit 53 of the ECU 50 in the travel control device 1 determines that the electric power corresponding to the estimated required travel energy is below the current remaining capacity of the battery 9, the process proceeds to the step ST3, and if determined not to be below, the process proceeds to the step ST7.

In the step ST3, the determination unit 53 of the ECU 50 in the travel control device 1 refers to the information of the navigation device 13 to determine whether or not the external power source 14 exists at the destination set by the destination setting unit 18. If the determination unit 53 of the ECU 50 in the travel control device 1 determines that the external power source 14 exists, the process proceeds to the step ST4, and if the external power source 14 is determined not to exist, the process proceeds to the step ST7.

In the step ST4, the second estimating unit 54 of the ECU 50 in the travel control device 1 estimates the expected charging time at the destination based on, for example, the information accumulated in the storage unit 51, then the process proceeds to the step ST5. In the step ST5, the drive switching unit 55 of the ECU 50 in the travel control device 1 determines whether or not the expected charging time estimated by the second estimating unit 54 exceeds the threshold value. If the drive switching unit 55 of the ECU 50 in the travel control device 1 determines that the expected charging time exceeds the threshold value, the process proceeds to the step ST6 and selects the first travel plan, and if the expected charging time is determined not to exceed, the process proceeds to the step ST7 and selects the second travel plan.

If the second travel plan is selected in the step ST7, the drive switching unit 55 of the ECU 50 in the travel control device 1 selects the EV mode, and stops the engine 5 or keeps a state where the engine 5 stops and the MG 6 operates alone in the step ST71 of FIG. 4. Then, the drive switching unit 55 of the ECU 50 in the travel control device 1 causes the hybrid vehicle 2 to travel only with a driving force for running by the MG 6, then the process proceeds to the step ST72. In the step ST72, the drive switching unit 55 of the ECU 50 in the travel control device 1 determines whether or not the SOC of the battery 9 is below a first predetermined value, which is determined in advance. If the drive switching unit 55 of the travel control device 1 determines the SOC of the battery 9 is below the first predetermined value, which is determined in advance, the process proceeds to the step ST74, and if the SOC of the battery 9 is determined not to be below the first predetermined value, which is determined in advance, the process proceeds to the step ST73.

In the step ST73, the drive switching unit 55 of the ECU 50 in the travel control device 1 determines whether or not the hybrid vehicle 2 is in a state of high load, for example, during high speed running or uphill running, which requires a relatively high drive torque based on the information from the transmission 7, the accelerator sensor 11 and the vehicle speed sensor 10. If the drive switching unit 55 of the travel control device 1 determines that the hybrid vehicle 2 is in a state of high load, the process proceeds to the step ST74, and if the hybrid vehicle 2 is determined not be in a state of high load, the process returns to the step ST72. In this way, the drive switching unit 55 of the travel control device 1 repeats the step ST72 and the step ST73 and keeps the EV mode to cause the hybrid vehicle 2 to travel with a driving force for running only by the MG 6 until the SOC is determined to be below the first predetermined value, which is determined in advance, or until the hybrid vehicle 2 is determined to be in a state of high load.

In the step ST74, the drive switching unit 55 of the ECU 50 in the travel control device 1 selects the HV mode and operates the engine 5. Then, the drive switching unit 55 of the ECU 50 in the travel control device 1 causes the hybrid vehicle 2 to travel with a driving force for running at least by the engine 5, then the process proceeds to the step ST75. In this way, if the drive switching unit 55 of the ECU 50 in the travel control device 1 determines that the SOC is below the first predetermined value, which is determined in advance, in the step ST72, or determines that the hybrid vehicle 2 is in a state of high load in the step ST73, the process proceeds to the step ST74, and selects the HV mode to cause the hybrid vehicle 2 to travel with a driving force for running at least by the engine 5. Also, in the step ST74, the drive switching unit 55 of the ECU 50 in the travel control device 1 operates the engine 5 in an efficient state as much as possible, while causing the MG 6 to compensate a surplus or shortage of a driving force for running or an engine brake force based on the information from the transmission 7, the accelerator sensor 11, the brake sensor 12 and the vehicle speed sensor 10. Specifically, the drive switching unit 55 of the ECU 50 in the travel control device 1 causes the MG 6 to perform regeneration braking during decelerating to provide a braking force to the driving wheels of the hybrid vehicle 2, while charging the battery 9 with the electric power generated by the MG 6. In this way, in the step ST74, the drive switching unit 55 of the ECU 50 in the travel control device 1 causes the MG 6 to perform regeneration braking during decelerating to charge the battery 9 to recover the SOC.

In the step ST75, the drive switching unit 55 of the ECU 50 in the travel control device 1 determines whether or not the SOC of the battery 9 is below the first predetermined value, which is determined in advance. If the drive switching unit 55 of the ECU 50 in the travel control device 1 determines that the SOC of the battery 9 is below the first predetermined value, the process repeats the step ST75, and if the SOC of the battery 9 is determined not to be below the first predetermined value, the process proceeds to the step ST76.

In the step ST76, the drive switching unit 55 of the ECU 50 in the travel control device 1 determines whether or not the hybrid vehicle 2 is in a state of high load based on the information from the transmission 7, the accelerator sensor 11, and the vehicle speed sensor 10. If the drive switching unit 55 of the ECU 50 in the travel control device 1 determines that the hybrid vehicle 2 is in a state of high load, the process returns to the step ST75, and if the hybrid vehicle 2 is determined not to be in a state of high load, the process returns to the step ST71.

In this way, after selecting the HV mode, the drive switching unit 55 of the ECU 50 in the travel control device 1 repeats the step ST75 and the step ST76, and keeps the HV mode until the SOC is determined not to be below the first predetermined value, and the hybrid vehicle 2 is determined not to be in a state of high load. Also, after selecting the HV mode, if the drive switching unit 55 of the travel control device 1 determines that the SOC is not below the first predetermined value, and the hybrid vehicle 2 is not in a state of high load, the process returns to the step ST71, and selects the EV mode.

If the first travel plan is selected in the step ST6, the drive switching unit 55 of the ECU 50 in the travel control device 1 selects the EV mode, and stops the engine 5 or keeps a state where the engine 5 stops and the MG 6 operates alone in the step ST61 of FIG. 5. Then, the drive switching unit 55 of the ECU 50 in the travel control device 1 causes the hybrid vehicle 2 to travel with a driving force for running only by the MG 6, then the process proceeds to the step ST62. In the step ST62, the drive switching unit 55 of the ECU 50 in the travel control device 1 determines whether or not the SOC of the battery 9 is below a second predetermined value, which is determined in advance. Note that the second predetermined value is a value that is different from the above-described first predetermined value, and is substantially smaller than the first predetermined value. If the drive switching unit 55 of the ECU 50 in the travel control device 1 determines that the SOC of the battery 9 is below the second predetermined value, which is determined in advance, the process proceeds to the step ST63, and if the SOC of the battery 9 is determined not to be below the second predetermined value, which is determined in advance, the process repeats the step ST62.

In the step ST63, the drive switching unit 55 of the ECU 50 in the travel control device 1 selects the HV mode and operates the engine 5. Then, the drive switching unit 55 of the ECU 50 in the travel control device 1 causes the hybrid vehicle 2 to travel with a driving force for running at least by the engine 5, then the process proceeds to the step ST64. Also in this step ST64, similarly to the above-described step ST74, the drive switching unit 55 of the ECU 50 in the travel control device 1 operates the engine 5 in an efficient state as much as possible, while causing the MG 6 to compensate a surplus or shortage of a driving force for running and an engine brake force, and charges the battery 9 with the electric power generated by the MG 6.

In the step ST64, the drive switching unit 55 of the ECU 50 in the travel control device 1 determines whether or not the SOC of the battery 9 is below the above-described first predetermined value. If the drive switching unit 55 of the ECU 50 in the travel control device 1 determines that the SOC of the battery 9 is below the first predetermined value, the process repeats the step ST64, and if the SOC of the battery 9 is determined not to be below the first predetermined value, the process returns to the step ST61 and selects the EV mode.

In this way, in the first travel plan, the drive switching unit 55 of the ECU 50 in the travel control device 1 repeats the step ST62, and keeps the EV mode to cause the hybrid vehicle 2 to travel with a driving force for running only by the MG 6 until the SOC is determined to be below the second predetermined value that is substantially smaller than the first predetermined value. That is, the drive switching unit 55 of the ECU 50 in the travel control device 1 select the EV mode and the HV mode in such a way as to inhibit frequently using the HV mode during a state of high load to increase the usage frequency of the EV mode more than the second travel plan until reaching the destination by causing the hybrid vehicle 2 to travel with a driving force for running only by the MG 6 until the SOC is determined to be below the second predetermined value that is substantially smaller than the first predetermined value. In this way, the drive switching unit 55 of the travel control device 1 selects the EV mode and the HV mode in such a way as to increase the usage frequency of the EV mode and suppress the usage frequency of the HV mode during a state of high load until reaching the destination more in the first travel plan where the expected charging time estimated by the second estimating unit 54 is longer than the threshold value than in the second travel plan where the estimated expected charging time is shorter than the threshold value. Note that, in this embodiment, the first travel plan corresponds to the case where the expected charging time estimated by the second estimating unit 54 is long, and the second travel plan corresponds to the case where the expected charging time estimated by the second estimating unit 54 is shorter than the threshold value.

The travel control device 1 of the embodiment increases the usage frequency of the EV mode in the first travel plan in which the expected charging time at the destination where the battery can be charged, which is estimated by the first estimating unit 52, is longer than a threshold value than in the second travel plan in which the expected charging time at the destination is shorter than the threshold value. Therefore, when the expected charging time at the destination where the battery 9 can be charged is long, the use of the HV mode during a state of high load is inhibited, which causes the hybrid vehicle 2 to travel with a driving force for running by the MG 6, until the SOC goes below the second predetermined value. Accordingly, unless the SOC goes below the second predetermined value, the hybrid vehicle 2 is forced to travel with a driving force for running only by MG 6 even the hybrid vehicle 2 gets in a state of high load on the way to the destination. Therefore, the electric power stored in the battery 9 can be surely used when the hybrid vehicle 2 travels, which can reduce the deterioration of fuel economy due to the drive of the engine 5 and further reduces the total running cost of the hybrid vehicle 2.

Also, when the expected charging time at the destination where the battery 9 can be charged is short, the use of the HV mode during the state of high is allowed, which can charge the battery 9 on the way to the destination. Accordingly, the charge of the battery 9 can be reduced during travelling after starting the destination, which can reduce the deterioration of fuel economy and further reduce the total running cost of the hybrid vehicle 2.

Further, the second estimating unit 54 estimates the expected charging time at the destination based on the actual charging time for each vehicle stop location of the hybrid vehicle 2 stored the storage unit 51, which can accurately estimate the expected charging time or a time in which the battery 9 can be charged.

Also, since the second predetermined value is set smaller than the first predetermined value, in the first travel plan, the electric power stored in the battery 9 can be surely used when the hybrid vehicle 2 travels, which can reduce the deterioration of fuel economy due to the drive of the engine 5 and further reduce the total running cost of the hybrid vehicle 2.

Further, when the second estimating unit 54 estimates the above-described default value as the expected charging time, or when the destination is not set in the destination setting unit 18, the drive switching unit 55 selects the first travel plan. Therefore, when the second estimating unit 54 sets the above-described default value as the expected charging time, or when the destination is not set in the destination setting unit 18, the engine 5 is not operated until the SOC goes below the second predetermined value even in a state of high load, which further can reduce the total running cost of the hybrid vehicle 2. Also, even when the second estimating unit 54 sets the above-described default value as the expected charging time, or even when the destination is not set in the destination setting unit 18, if the SOC goes below the second predetermined value, the HV mode is selected to cause the hybrid vehicle 2 to travel with a driving force for running by the engine 5, which can recover the SOC of the battery 9.

Figure 6:
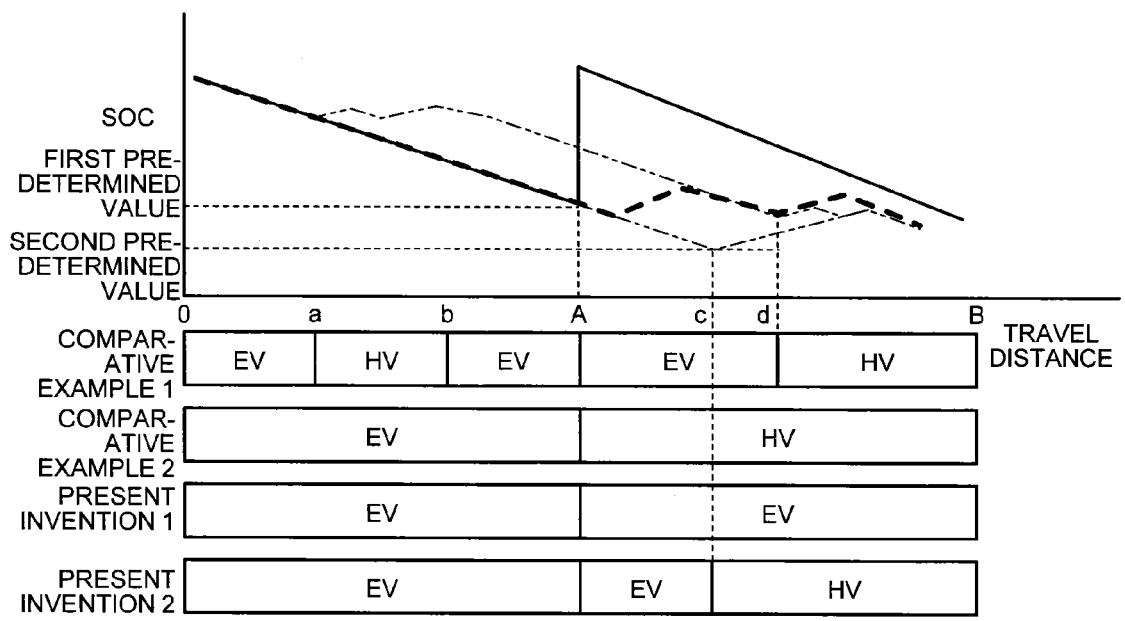
FIG. 6 is a diagram describing transitions of the SOC relative to the travelling distance of comparative examples and the present invention.

Thus, as illustrated in FIG. 6, when the travel control device 1 of the embodiment selects the first travel plan, the travel control device 1 does not operate the engine 5 until the SOC goes below the second predetermined value even in a state of high load, which surely allows further reduction in the total running cost of the hybrid vehicle 2. Note that, in FIG. 6, the horizontal axis indicates the travel distance of the hybrid vehicle 2, while the vertical axis indicates the SOC of the battery 9. The comparative example 1 indicates a conventional example that only selects the second travel plan. This example selects the HV mode between the points "a" and "b" since it gets in a state of high load, and also selects the HV mode between the points "d" and "B" since the SOC of this example goes below the first predetermined value, and selects the EV mode in the remaining intervals. The comparative example 2 indicates another conventional example that only selects the second travel plan. This example selects the EV mode between the points "0" and "A", and selects the HV mode between the points "A" and "B" since the SOC of this example goes below the first predetermined value. The comparative example 1 is indicated by the one dot chain line in FIG. 6, while the comparative example 2 is indicated by the dotted line in FIG. 6. Also, the present invention 1 indicates the above-described embodiment that selects the first travel plan or the EV mode in all intervals by sufficiently charging the battery at the point "A". The present invention 2 indicates the above-described embodiment that does not charge the battery at the point "A". This example selects the first travel plan or the EV mode between the points "0" and "c", and selects the HV mode between the points "c" and "B" since the SOC of this example goes below the second predetermined value. The present invention 1 is indicated by the solid line in FIG. 6, and the present invention 2 is indicated by the two-dot chain line in FIG. 6. Note that FIG. 6 is a diagram describing transitions of the SOC relative to travelling distance of comparative examples and the present invention.

Modification

The following describes a modification of the travel control device 1 according to the embodiment of the present invention. FIG. 7 is a flowchart for selecting the travel plans of the ECU in the travel control device of the modification according to the embodiment, and FIG. 8 is an explanatory diagram illustrating a map for setting the proportion of the first travel plan of the drive switching unit of the ECU in the travel control device of the modification according to the embodiment. Note that, in the modification, the same reference numerals are given to the components same as those of the above-described embodiment, and description thereof will be omitted.

In this modification, the drive switching unit 55 of the ECU 50 in the travel control device 1 sets the proportion of the first travel plan and the second travel plan based on the expected charging time estimated by the second estimating unit 54 in the step ST5a illustrated in FIG. 7. Specifically, for example, the drive switching unit 55 previously stores a map, illustrated in FIG. 8, illustrating the relation between the estimated expected charging time and the first travel plan, and reads out, from the map illustrated in FIG. 8, the proportion of the first travel plan corresponding to the expected charging time estimated by the second estimating unit 54.

In the map illustrated in FIG. 8, the expected charging times $T_1, T_2, T_3, \ldots T_n$ respectively correspond to proportions $R_1, R_2, R_3, \ldots R_n$ of the first travel plans, and the expected charging times are expressed as $T_1 > T_2 > T_3 >, \ldots > T_n$, and the proportions of the first travel plans are expressed as $R_1 > R_2 > R_3 >, \ldots > R_n$. In addition, when the expected charging time is $T_1$, the proportion $R_1$ is 100%, and when the expected charging time is $T_n$, the proportion $R_n$ is 0%.

The drive switching unit 55 reads out the proportion corresponding to the expected charging time estimated by the second estimating unit 54 from the map illustrated in FIG. 8. When the expected charging time estimated by the second estimating unit 54 does not match any of the expected charging times $T_1, T_2, T_3, \ldots T_n$ in the map illustrated in FIG. 8, the drive switching unit 55 reads out one of the proportions $R_1, R_2, R_3, \ldots R_n$, which corresponds to one of the expected charging times $T_1, T_2, T_3, \ldots T_n$, which is closest to the expected charging time estimated by the second estimating unit 54. Also, the drive switching unit 55 sets the proportion of the first travel plan as $R_1$ when the expected charging time estimated by the second estimating unit 54 is longer than the expected charging time $T_1$, and sets the proportion of the first travel plan as $R_n$ when the expected charging time estimated by the second estimating unit 54 is shorter than the expected charging time $T_n$.

Then, the drive switching unit 55 divides the distance to the destination into a distance for travelling with the first travel plan and a distance for travelling with the second travel plan depending on the proportion obtained from the map illustrated in FIG. 8, and causes the hybrid vehicle 2 to travel to the destination with switching the first travel plan and the second travel plan depending on the divided distances. In this way, in the modification, the drive switching unit 55 gradually increases the proportion of travelling with the first travel plan as the expected charging time estimated by the second estimating unit 54 becomes long. Thus, the drive switching unit 55 selects the EV mode and the HV mode in such a way as to increase the usage frequency of the EV mode until reaching the destination in a case where the expected charging time estimated by the second estimating unit 54 is longer than the threshold value than a case where the expected charging time is shorter than the threshold value. Also, in the modification, the drive switching unit 55 gradually increases the proportion of travelling with the first travel plan as the expected charging time estimated by the second estimating unit 54 becomes long. Thus, the drive switching unit 55 selects the EV mode and the HV mode in such a way as to suppress the usage frequency of the HV mode during a state of high load until reaching the destination in a case where the expected charging time estimated by the second estimating unit 54 is longer than the threshold value than a case where the expected charging time is shorter than the threshold value.

Similarly to the travel control device 1 according to the above-described embodiment, the travel control device 1 according to this modification can reduce the deterioration of fuel economy due to the drive of the engine 5 and further reduce the total running cost of the hybrid vehicle 2.

The following describes a travel control device 1 according to a disclosed example 1. FIG. 9 a flowchart for selecting the travel plans of an ECU in the travel control device according to the disclosed example 1. Note that, in the disclosed example 1, the same reference numerals are given to the components same as those of the above-described embodiment, and description thereof will be omitted.

In the disclosed example 1, if the determination unit 53 determines that the electric power corresponding to the estimated required travel energy is below the current remaining capacity of the battery 9 in the step ST2 illustrated in FIG. 9, the determination unit 53 of the ECU 50 in the travel control device 1 refers to the information of the navigation device 13 and the information stored in the storage unit 51 to determine whether or not the external power source 14 exists at the destination set by the destination setting unit 18 in the step ST3a. In the step ST3a, the determination unit 53 determines that the battery 9 may be charged if, for example, the external power source 14 exists at the destination, and the battery 9 was charged by the external power source 14 in the past at the location set as the destination. If the determination unit 53 of the ECU 50 in the travel control device 1 determines that the battery 9 may be charged from the external power source 14 at the destination set by the destination setting unit 18 in the step ST3a, the process proceeds to the step ST6, and if the determination unit 53 determines that the battery may not be charged, the process proceeds to the step ST7.

In the disclosed example 1, if the determination unit 53 of the ECU 50 in the travel control device 1 determines that the battery 9 may be charged from the external power source 14 at the destination set by the destination setting unit 18, the first travel plan is performed, which can reduce the deterioration of fuel economy due to the drive of the engine 5 and further reduces the total running cost of the hybrid vehicle 2.

Figure 10:
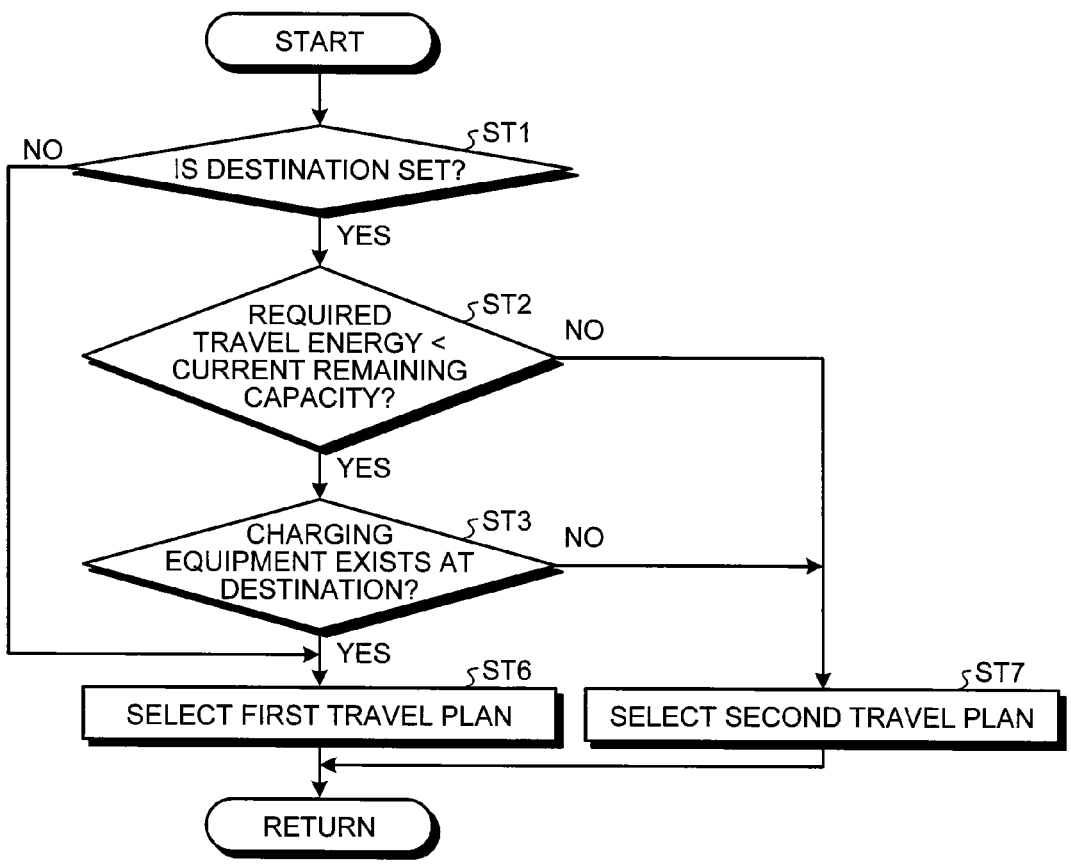
FIG. 10 is a flowchart for selecting the travel plans of an ECU in a travel control device according to a disclosed example 2.

The following describes the travel control device 1 according to a disclosed example 2. FIG. 10 is a flowchart for selecting the travel plans of an ECU in the travel control device according to the disclosed example 2. Note that, in the disclosed example 2, the same reference numerals are given to the components same as those of the above-described embodiment, and description thereof will be omitted.

In the disclosed example 2, if the determination unit 53 of the ECU 50 in the travel control device 1 determines that the external power source 14 exists at the destination set by the destination setting unit 18 in the step ST3 illustrated in FIG. 10, the process proceeds to the step ST6, and if the external power source 14 is determined not to exist, the process proceeds to the step ST7.

In the disclosed example 2, the determination unit 53 of the ECU 50 in the travel control device 1 determines that the external power source 14 exists at the destination set by the destination setting unit 18, the first travel plan is selected, which can reduce the deterioration of fuel economy due to the drive of the engine 5 and further reduce the total running cost of the hybrid vehicle 2.

Figure 11:
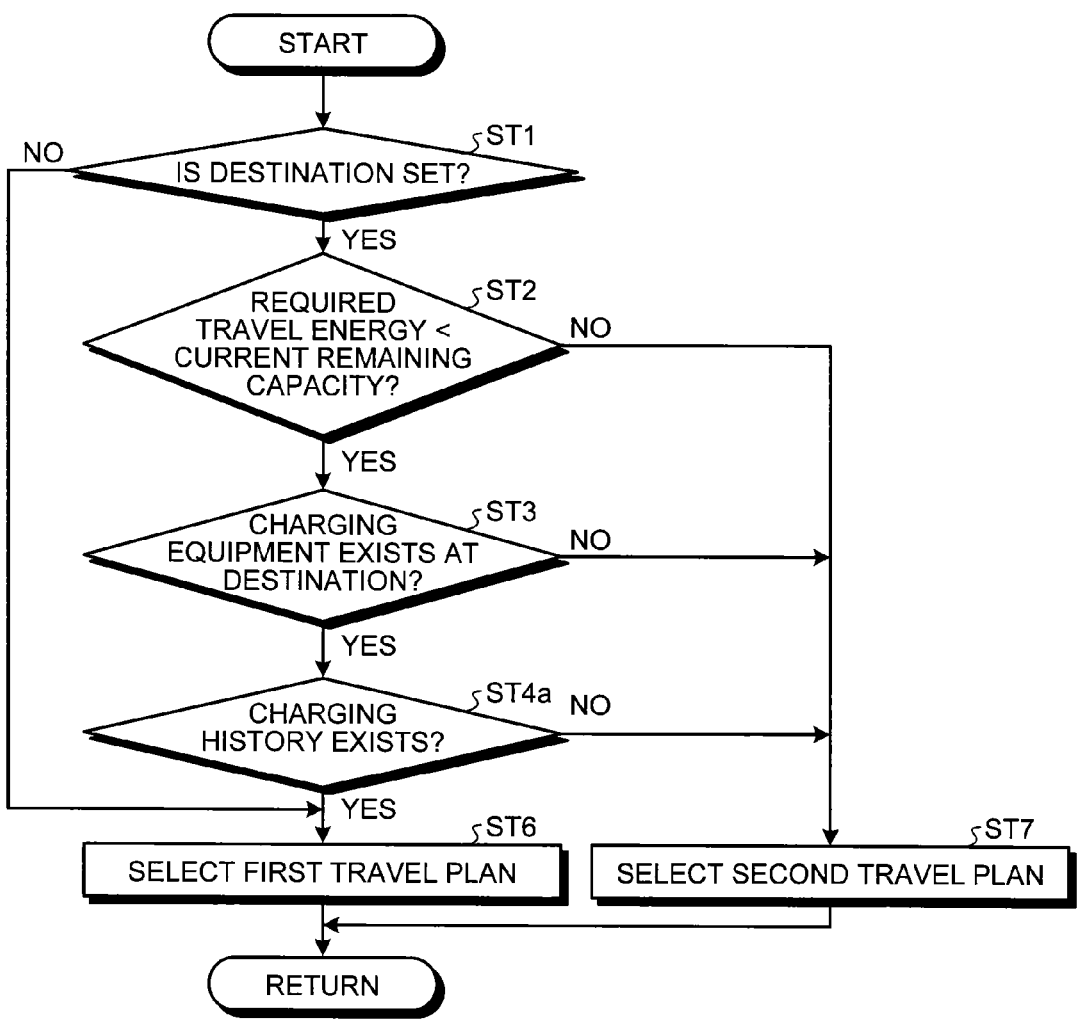
FIG. 11 is a flowchart for selecting the travel plans of an ECU in a travel control device according to a disclosed example 3.

The following describes the travel control device 1 according to a disclosed example 3. FIG. 11 is a flowchart for selecting the travel plans of an ECU in the travel control device according to the disclosed example 3. Note that, in the disclosed example 3, the same reference numerals are given to the components same as those of the above-described embodiment, and description thereof will be omitted.

In the disclosed example 3, the determination unit 53 of the ECU 50 in the travel control device 1 refers to the information of the storage unit 51 to determines whether or not the battery 9 was charged by the external power source 14 in the past at the destination set by the destination setting unit 18 in the step ST4a illustrated in FIG. 11, if the determination unit 53 determines that the battery 9 was charged, the process proceeds to the step ST6, if the determination unit 53 determines that the battery 9 was not charged, the process proceeds to the step ST7.

In the disclosed example 3, if the determination unit 53 of the ECU 50 in the travel control device 1 determines that the battery 9 was charged at the destination set by the destination setting unit 18, the first travel plan is selected, which can reduce the deterioration of fuel economy due to the drive of the engine 5 and further reduce the total running cost of the hybrid vehicle 2.

Note that the travel control device 1 according to, for example, the above-described embodiment of the present invention is not limited to the above-described embodiment and the modification, and can be made a variety of changes without departing the spirit of the present invention. The travel control device according to the embodiment can appropriately combines the components of the embodiment and the modification.

For example, in the travel control device 1 according to the above-described embodiment, although the first predetermined value and the second predetermined value are different from each other and the second predetermined value is smaller than the first predetermined value, the first predetermined value may be equal to the second predetermined value in the present invention. Also in this case, when the first travel plan is selected, the HV mode is not selected even in a state of high load, which can reduce the deterioration of fuel economy due to the drive of the engine 5 and further reduce the total running cost of the hybrid vehicle 2.

Also in the above-described embodiment, although the MG 6 is used as a motor, which has a power running function and a regenerative function in combination, the present invention is not limited to this, for example a motor which has a power running function, and a generator which has a regenerative function may be used in combination.

REFERENCE SIGNS LIST

1 TRAVEL CONTROL DEVICE
2 HYBRID VEHICLE
5 ENGINE (INTERNAL COMBUSTION ENGINE)
6 MG (MOTOR)
9 BATTERY
14 EXTERNAL POWER SOURCE
51 STORAGE UNIT
54 SECOND ESTIMATING UNIT
55 DRIVE SWITCHING UNIT

The invention claimed is:

1. A travel control device of a hybrid vehicle comprising:
a battery configured to be charged with electric power from an external power source;
a motor configured to generate a driving force for running with the electric power of the battery; and
an engine configured to generate a driving force for running, the travel control device being configured to select an EV mode for travelling with a driving force for running only by a motor, and an HV mode for travelling with a driving force for running at least by an engine, wherein the travel control device estimates an expected charging time at a set destination where the battery can be charged, and selects one of the EV mode and the HV mode in such a way as to increase a usage frequency of the EV mode by suppressing a usage frequency of the HV mode during a state of high load until reaching the destination in a case where the estimated expected charging time is longer than a threshold value.

2. The travel control device according to claim 1, wherein the travel control device stores an actual charging time taken for actually charging the battery from the external power source for each vehicle stop location of the hybrid vehicle, and estimates the expected charging time based on the stored actual charging time for each vehicle stop location.

3. The travel control device according to claim 2, wherein the travel control device inhibits the HV mode during a state of high load in a case where the estimated expected charging time is longer than the threshold value.

4. The travel control device according to claim 1, wherein the travel control device inhibits the HV mode during a state of high load in a case where the estimated expected charging time is longer than the threshold value.

5. The travel control device according to claim 1, wherein the travel control device selects a first travel plan in a case where the estimated expected charging time is longer than the threshold value, and selects a second travel plan in a case where the estimated expected charging time is equal to or less than the threshold value, when the first travel plan is selected, the travel control device selects and keeps the EV mode until a state of charge of the battery is determined to be below a second predetermined value that is smaller than a first predetermined value, and when the second travel plan is selected, the travel control device selects and keeps the EV mode until the state of charge of the battery is determined to be below the first predetermined value, or until the hybrid vehicle is determined to be in the state of high load.

* * * * *